United States Patent
Okumura

(10) Patent No.: US 7,045,998 B2
(45) Date of Patent: May 16, 2006

(54) ROTATION DETECTING DEVICE

(75) Inventor: Hirofumi Okumura, Miyagi-ken (JP)

(73) Assignees: ALPS Electric Co., Ltd, Tokyo (JP); NSK Ltd., Tokyo (JP); NSK Steering Systems Co., Ltd, Tokyo (JP)

( * ) Notice: Subject to any disclaimer, the term of this patent is extended or adjusted under 35 U.S.C. 154(b) by 110 days.

(21) Appl. No.: 10/423,153

(22) Filed: Apr. 24, 2003

(65) Prior Publication Data
US 2003/0214284 A1 Nov. 20, 2003

(30) Foreign Application Priority Data
May 16, 2002 (JP) ............... 2002-141222

(51) Int. Cl.
*G01B 7/30* (2006.01)
(52) U.S. Cl. ................................. 324/207.25
(58) Field of Classification Search ........... 324/204.25, 324/207.25; 180/443
See application file for complete search history.

(56) References Cited

U.S. PATENT DOCUMENTS

| | | | |
|---|---|---|---|
| 5,133,423 A * | 7/1992 | Ijiri et al. .................... 180/444 |
| 5,203,421 A * | 4/1993 | Ueno et al. .................. 180/417 |
| 5,333,700 A * | 8/1994 | Mouri .......................... 180/444 |
| 5,719,459 A * | 2/1998 | Hasegawa ................... 310/268 |
| 6,130,425 A * | 10/2000 | Sano ...................... 250/231.14 |
| 6,404,084 B1 * | 6/2002 | Niki et al. ................. 310/75 R |
| 2001/0007295 A1 * | 7/2001 | Bloch et al. ................ 180/446 |
| 2002/0060105 A1 * | 5/2002 | Tominaga et al. .......... 180/443 |
| 2002/0097044 A1 * | 7/2002 | Tateishi et al. ......... 324/207.21 |

FOREIGN PATENT DOCUMENTS

JP 2001-349703 12/2001

* cited by examiner

*Primary Examiner*—Edward Lefkowitz
*Assistant Examiner*—David M Schindler
(74) *Attorney, Agent, or Firm*—Beyer Weaver & Thomas, LLP

(57) ABSTRACT

A steering output part is fixed with a worm wheel for power assist. By a spur gear formed on the worm wheel, an input gear of a detecting unit is rotated with a speed increase. Within the detecting unit, provided is a speed-reducing mechanism for speed-reducing the rotation of the detecting shaft. By this speed reduction, a detection rotating member provided in a case rotates at an angle of 1:1 to the rotation of the steering output part, a rotation angle of which is detected by a detecting element.

2 Claims, 7 Drawing Sheets

ROTATION DETECTING DEVICE

BACKGROUND OF THE INVENTION

1. Field of the Invention

The present invention relates to a rotation detecting device for detecting a rotation angle of a rotator that is a subject of detection, such as a vehicular steering shaft.

2. Description of the Related Art

FIG. 8 is a schematic view showing a structure of a conventional electrically-operated power steering control device (hereinafter, referred to as EPS control device) and a rotation detecting device for detecting a rotation angle of a steering shaft.

As shown in FIG. 8, the steering shaft 2 fixed in a center of a steering wheel 1 is rotatably held by a support member 6 provided in a dashboard of a vehicular compartment. The steering shaft 2 has a tip integrally provided or fixed with a detecting shaft part 3, at a tip of which a steering output part 4 is further provided. The steering output part 4 has a tip coupled with a manual steering gear. Front-wheel tires are secured on the wheels provided at the both ends of the manual steering gear.

The steering output part 4 is fixed with a worm wheel 5 as a power assist rotator. In the vicinity of the worm wheel 5, an electrically-operated power assist motor 7 is provided. The power assist motor 7 has an output shaft 7a fixed with a worm gear 8. The worm gear 8 is in mesh with the teeth 5a in the outer periphery of the worm wheel 5.

The detecting shaft part 3 is provided with a torque detecting device 9 and a rotation detecting device 10. In the torque detecting device 9, the torque applied to the detecting shaft part 3 is converted into a voltage or the like, an output of which is provided to a torque-detection control section of a microcomputer or the like. In the torque-detection control section, an assist amount is operated on the basis of the torque output and a vehicle-speed signal, ignition-on signal or the like. On the basis of the operation value, the power assist motor 7 is placed under control. The power of the power assist motor 7 is provided to the steering shaft 2, to thereby set a steering force of the steering wheel 1.

Meanwhile, the rotation detecting device 10 is for detecting a rotation angle of the steering shaft 2. For example, in the case over-steering or under-steering takes place on the vehicle during driving, an optimal steering angle is indexed, by the microcomputer, from the steering angle detected by the rotation detecting device 10, the vehicle speed and the like. The power assist motor 7 is placed under control, to adjust the steering angle of the front wheels or regulate the brake force, thereby steering the automobile in the optimal state.

However, the conventional rotation detecting device 10 is constructed with the detecting shaft part 3 of the steering shaft inserted through a central part thereof. Within the rotation detecting device 10, there are provided a rotating part fitted on an outer periphery of the detecting shaft part 3 and rotating in unison with the detecting shaft part 3, and a detection rotating member to be operated by the rotating part, whereby a rotation angle of the detecting rotating member can be detected by a detecting element. In this manner, the rotation detecting device 10 is constructed by arranging the detection rotating member and the detecting element in the outer peripheral region of the steering shaft 2. Consequently, the rotation detecting device 10 has an increased size of outer diameter.

Meanwhile, the rotation detecting device 10 is required to linearly detect a rotation angle of less than 360 degrees of the steering shaft 2. Accordingly, basically, it is preferred to provide a detection rotating member rotatable with a correspondence of 1:1 to the rotation angle of the steering shaft, thereby detecting a rotation angle of the rotating member. However, in order to set a rotation angle ratio of 1:1, there is a need to arrange a gear having the same diameter as the rotation part fitted on the outer periphery of the detection shaft part 3. Therefore, the rotation detecting device 10 is size-increased furthermore.

However, because of the difficulty in securing a space for arranging a large-sized rotation detecting device 10 around the steering shaft 2, the conventional rotation detecting device 10 is arranged therein with a gear having a small diameter. As a result, the rotation of the steering shaft 2 is speed-increased and conveyed to the detection rotation member, e.g. the detection rotating member rotates twice or trice during once rotation of the steering shaft 2. Consequently, in order to correctly detect a rotation angle of the steering shaft 2, there is a necessity to newly provide detecting means that generates a pulse whenever the detection rotating member rotates once, for example. Namely, unless the detecting means is provided, the same signals would be outputted twice or trice from the detecting element detecting a rotation angle of the detection rotating member before the steering shalt 2 rotates 360 degrees, resulting in the impossibility to correctly detect a steering angle.

It is an object of the present invention to provide a rotation detecting device which can be made in a small-sized structure and moreover have a rotation angle ratio of a subject-of-detection and detection rotation member placed in a correspondence of 1:1.

It is another object of the invention to provide a rotation detecting device having a space around the steering shaft allowed for effective utilization.

SUMMARY OF THE INVENTION

The present invention can be structured comprising: a case; a detecting shaft extending inside and outside the case and rotatably supported; an input gear provided at an outside of the case and fixed to the detecting shaft; a speed-reducing mechanism provided in the case and for speed-reducing a rotation of the detecting shalt; a detection rotating member to be rotated with speed reduction byte speed-reducing mechanism; and a detecting member for detecting a rotation angle of the detection rotating member; wherein provided is a speed-increasing mechanism for delivering a rotation with speed increase from a rotator as a subject of detection to the input gear, a rotation force of from the rotator being delivered to the detection rotating member through the speed-increasing mechanism and speed-reducing mechanism, a rotation angle of the detection rotating member being set at one-Nth (N is an integer) of a rotation angle of the rotator.

This structure can accurately detect a rotation angle of the rotator because the detection rotating member has a rotation angle of one turn or less per one turn of the rotator as a subject of detection.

Also, in case the detection rotating member and the rotator are set at a rotation angle ratio of 1:1, it is easy to signal-process a detection output from the detecting member.

For example, the rotator as a subject of detection is an automotive steering shaft. In this case, it is preferred that the rotator as a subject of detection is an automotive steering shaft, the steering shaft being provided with an assist rotator to which assist power is to be provided, the input gear being in mesh with a gear rotating in unison with the power assist rotator thereby structuring the speed-increasing mechanism.

Because the detecting shaft can be rotated by a rotation force of the power assist rotator, it is possible to arrange a mechanism for detecting a rotation in a narrow space at around the steering shaft.

Meanwhile, the invention is characterized in that: an automotive steering shaft is provided with a power assist rotator to which an assist power is to be provided; wherein provided are a detecting shaft to be rotated by the power assist rotator, a detection rotating member to be rotated by the detecting shaft, and a detecting member for detecting a rotation angle of the detection rotating member.

For example, a gear is integrally formed on the power assist rotator, an input gear provided on the detecting shaft being in mesh with the gear.

Also in this case a rotation angle of the detection rotating member is preferably set at one-Nth (N is an integer) of a rotation angle of the steering shaft. Furthermore, a rotation angle of the detection rotating member and a rotation angle ratio of the steering shaft are preferably set at 1:1.

Also, in the invention, a plurality of waveform outputs different in phase are preferably to be obtained from the detecting member.

By processing a plurality of waveform outputs and carrying out an arc-tangential operating process on them, a rotation angle can be converted into a linear output.

BRIEF DESCRIPTION OF THE DRAWINGS

FIG. 2 shows a first embodiment of an arrangement example of the rotation detecting device, wherein

FIG. 3 shows a second embodiment of an arrangement example of the rotation detecting device, wherein

FIG. 4 shows a third embodiment of an arrangement example of the rotation detecting device, wherein

FIG. 5 shows a detecting unit constituting a major part of the rotation detecting device, wherein

DESCRIPTION OF THE PREFERRED EMBODIMENTS

Figure 1:
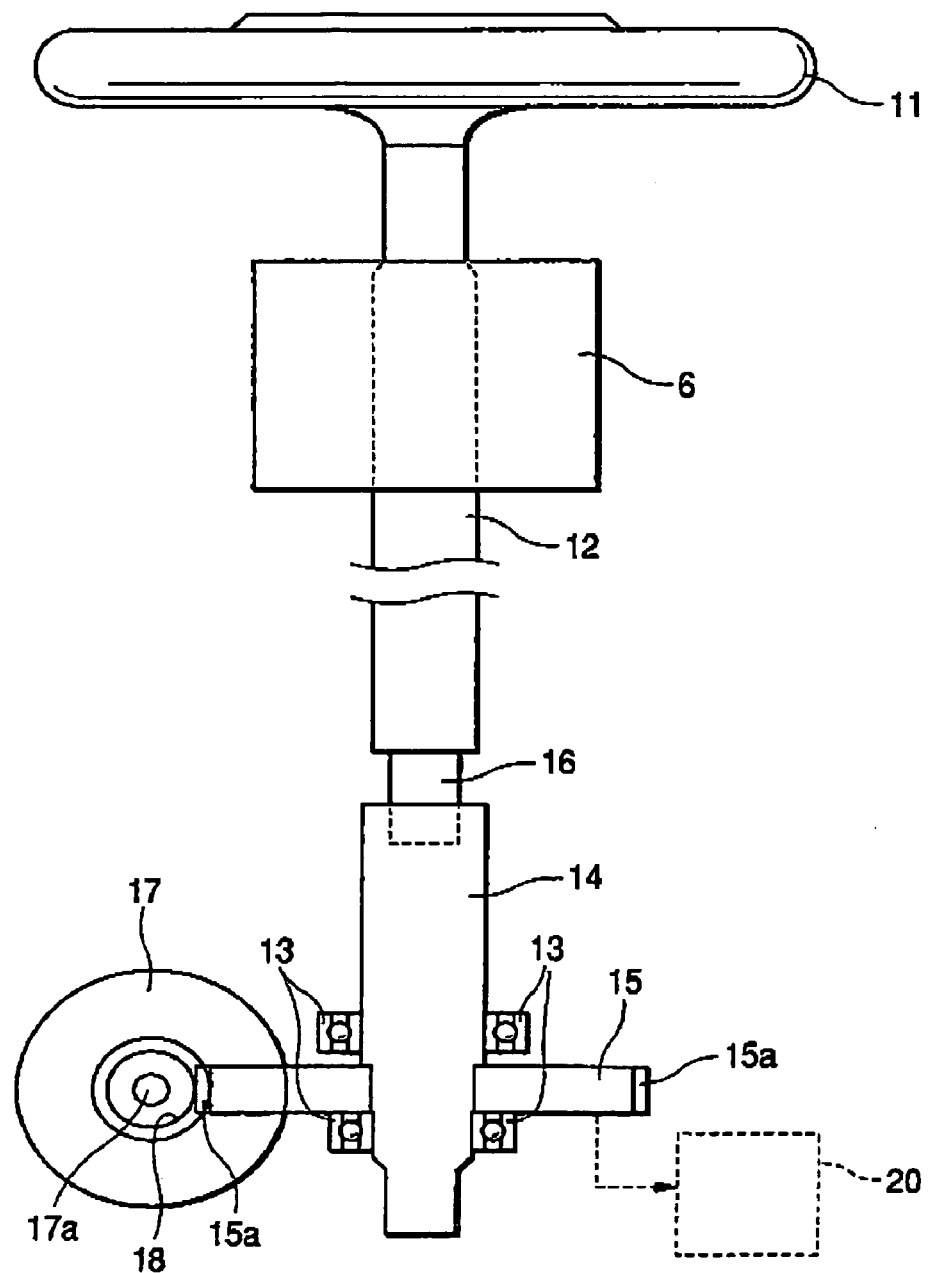
FIG. 1 is a schematic front view showing a structure of an electrically operated power steering control device as a mounting example of a rotation detecting device of the present invention.

FIG. 1 is a schematic view showing a structure of an EPS control unit (electrically-operated power steering control unit) on which is provided a rotation detecting device according to an embodiment of the present invention.

Figure 2A:
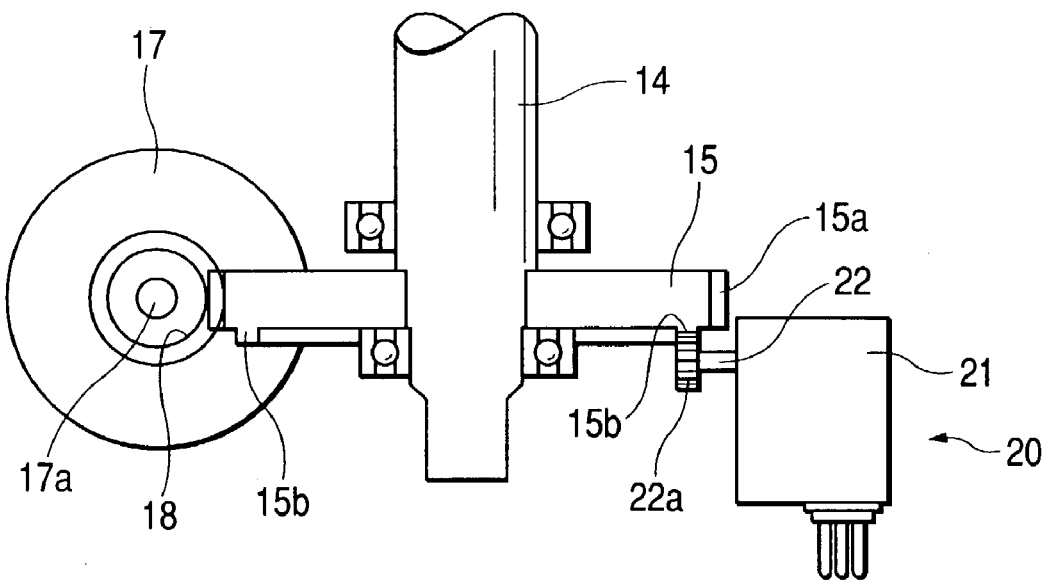
FIG. 2A is a front view and FIG. 2B is a bottom view thereof.
Figure 2B:
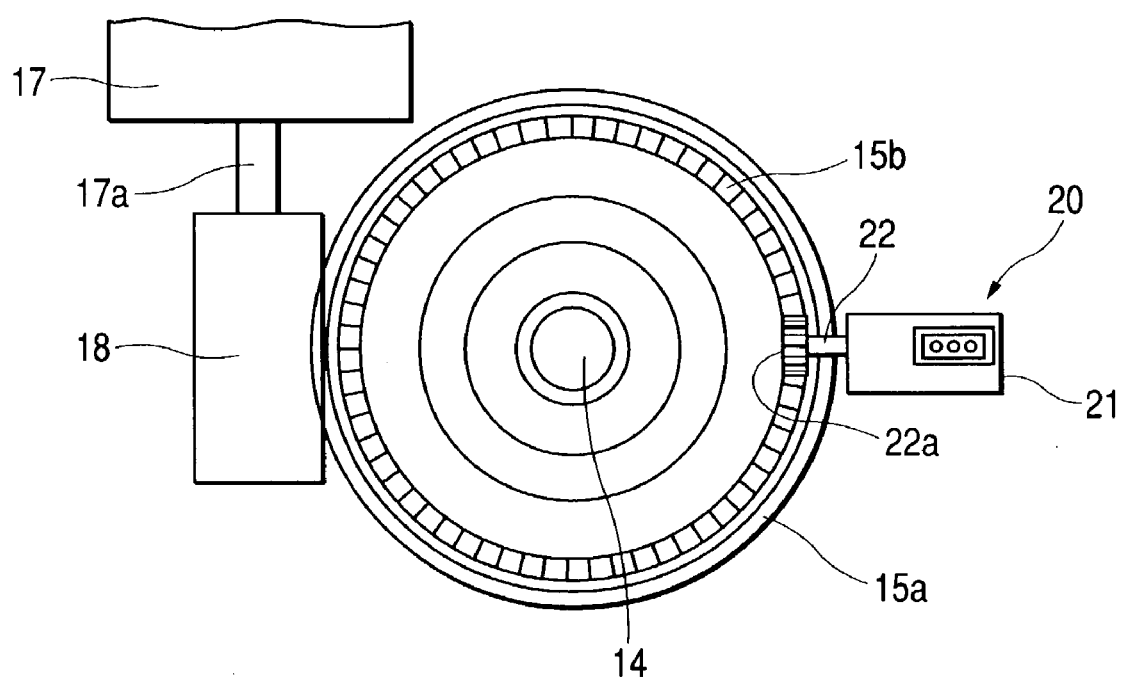
Figure 3A:
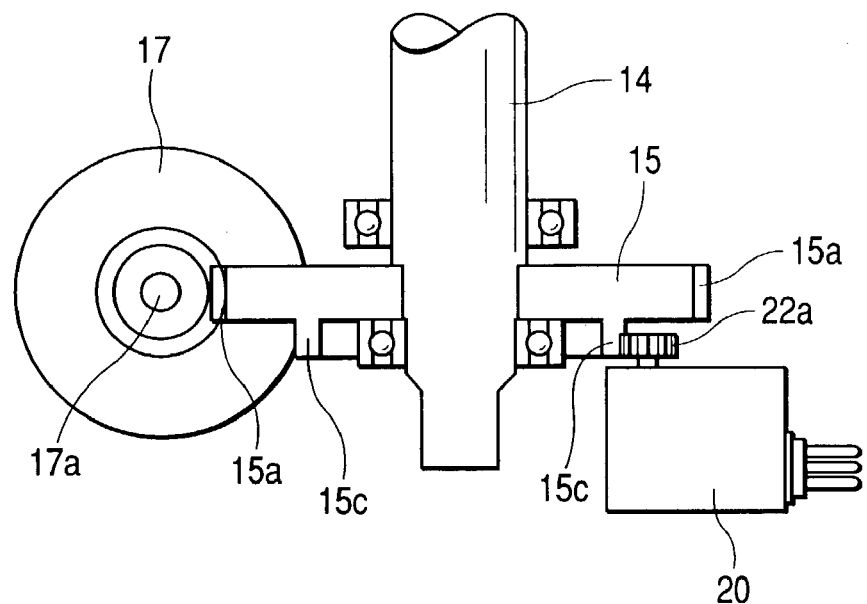
FIG. 3A is a front view and FIG. 3B is a bottom view thereof.
Figure 3B:
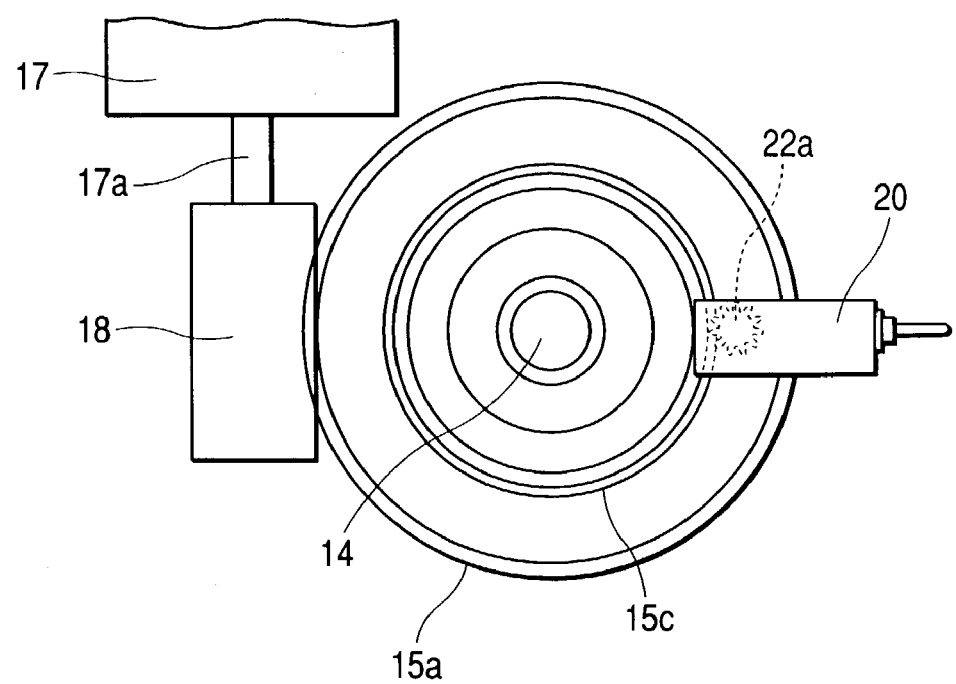
Figure 4A:
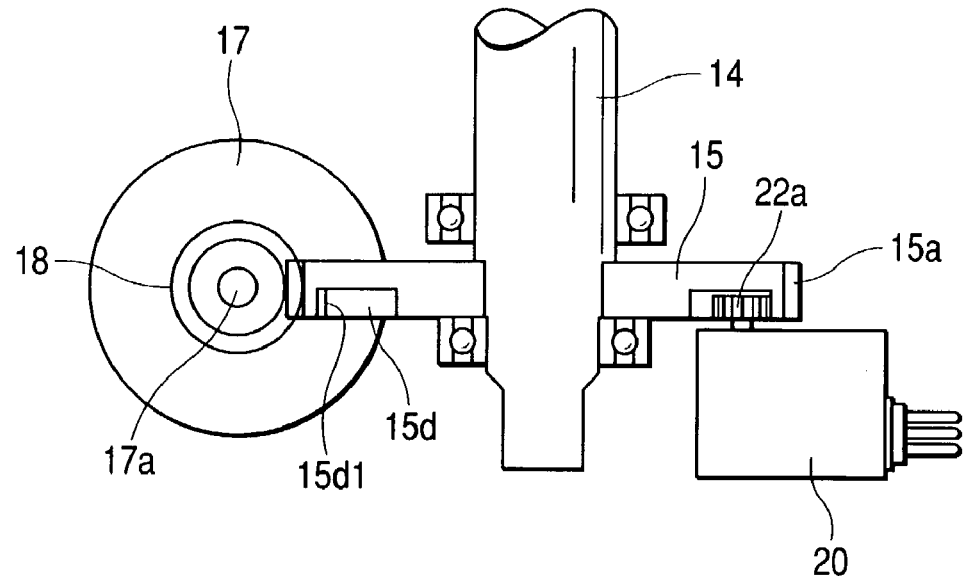
FIG. 4A is a front view and FIG. 4B is a bottom view thereof.
Figure 4B:
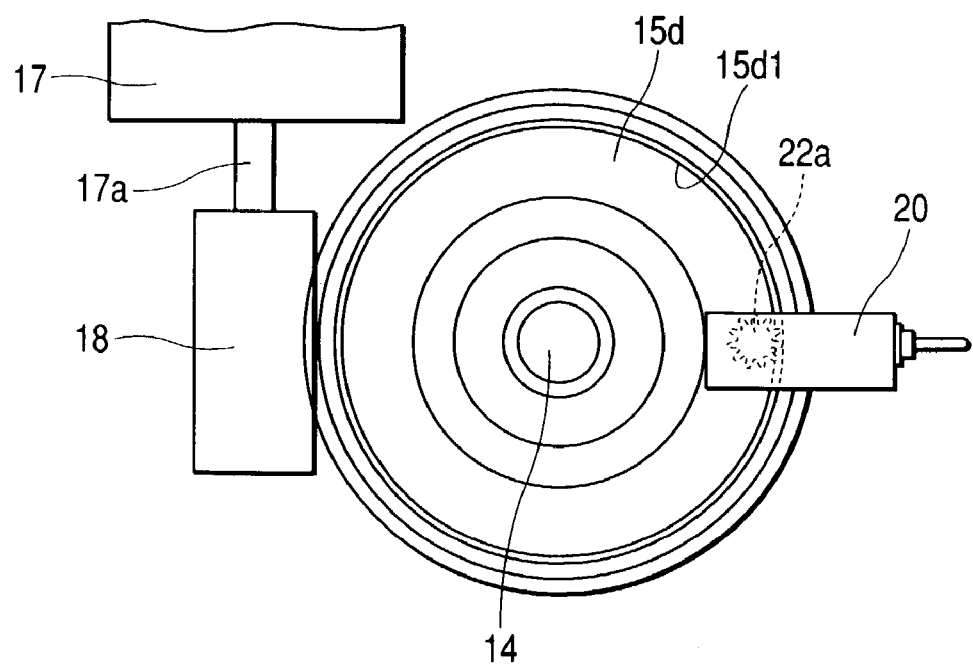

FIGS. 2 to 3 show an arrangement state of a detecting unit constituting a major part of the rotation detecting device. FIG. 2A is a front view showing a first embodiment while FIG. 2B is a bottom view thereof. FIG. 3A is a front view showing a second embodiment while FIG. 3B is a bottom view thereof. FIG. 4A is a front view showing a third embodiment while FIG. 4B is a bottom view thereof.

Figure 5A:
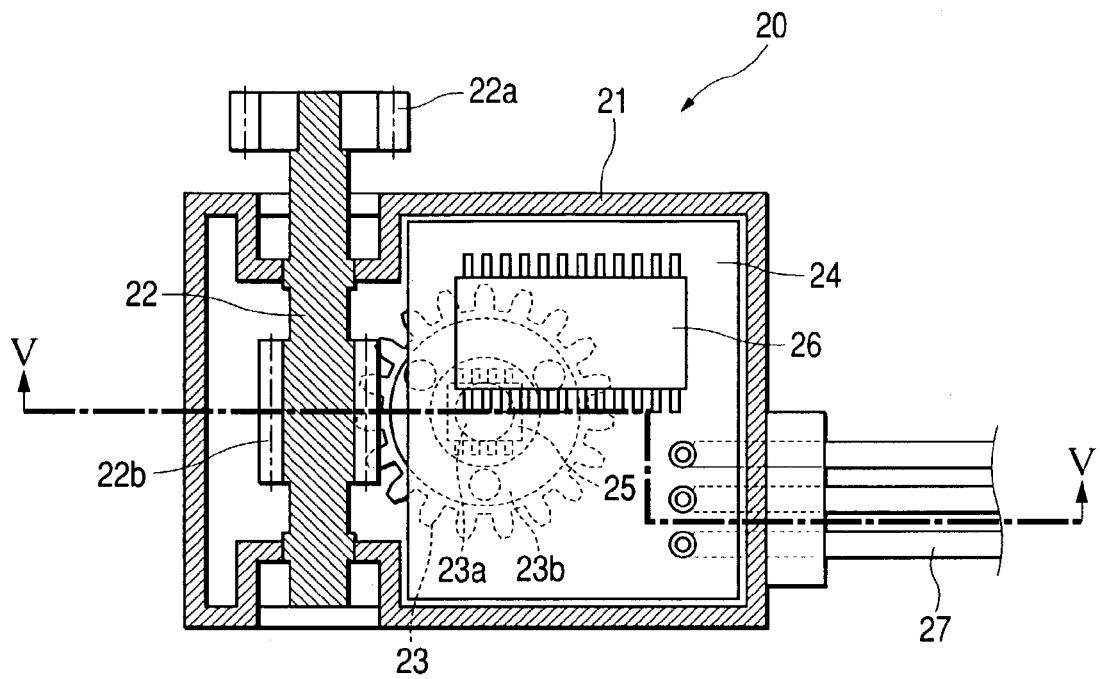
FIG. 5A is a plan sectional view and FIG. 5B is a bottom view of FIG. 5A.
Figure 5B:
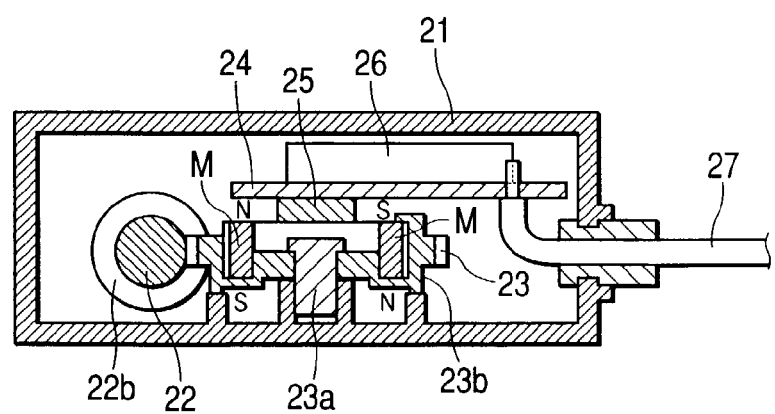

Meanwhile, FIG. 5A is a plan sectional view of a detecting unit constituting a major part of the rotation detecting device while FIG. 5B is a sectional view taken along line V—V in FIG. 5A.

Figure 8:
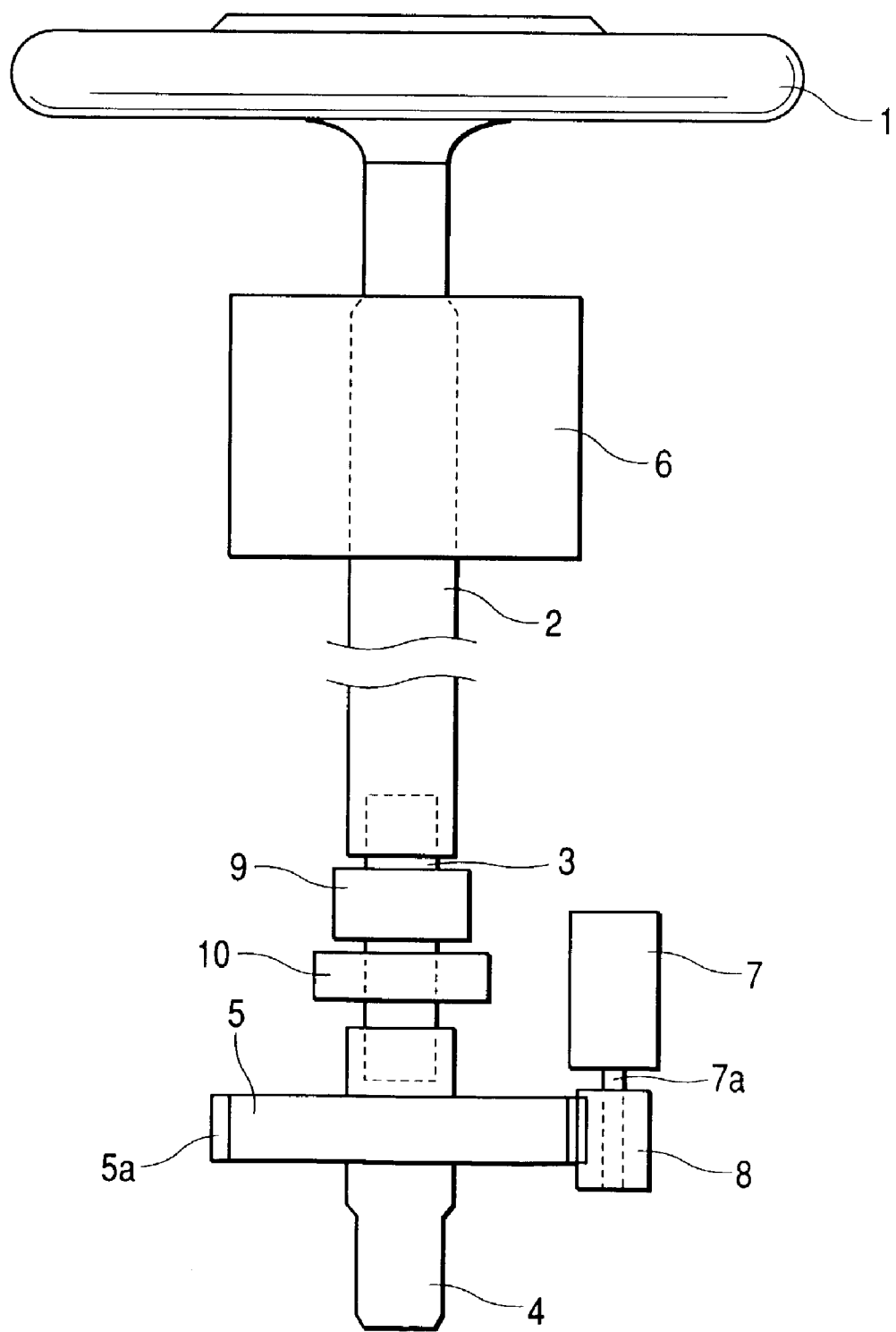
FIG. 8 is a front view of a steering part provided with a conventional rotation detecting device.

The EPS control unit shown in FIG. 1 is similar in basic structure to the conventional EPS control unit shown in FIG. 8.

Namely, a steering wheel 11 is fixed at the upper end of a steering shaft 12 as a rotator of a subject of detection in the rotation detecting device. The steering shaft 12 has, in its lower part, a steering output part 14. The steering output part 14 is a part of the steering shaft 12. The steering output part 14 is rotatably supported by bearings 13, 13. As mentioned before, the rotation of the steering shaft 12 is conveyed from the steering output part 14 to a manual steering gear, thereby controlling the steering angle of the wheels supporting the front-wheel tires.

The steering output part 14 is fixed with a worm wheel 15 as a power assist rotator. An electrically-operated power assist motor 17 is provided in a vicinity of the steering output part 14, having an output shaft 17a fixed with a worm gear 18. The worm gear 18 is in mesh wit the teeth 15a formed in the outer periphery of the worm wheel 15. Thus, the steering output part 14, the worm wheel 15, and the newer assist motor 17 in general function as the power assist rotator as described in detail below.

Although not shown, a torque detecting device is provided on a detecting shaft 16 forming a part of the steering shaft 12. The load torque caused upon rotating the steering shaft 12 is detected by the torque detector. The detected output is provided to a microcomputer where it is operation-processed. Depending upon a result of the operation, the output of the power assist motor 17 is placed under control. This regulates the power to be provided from the power assist motor 17 to the worm wheel 15, thereby making it possible to vary the load during steering of the steering wheel 11.

In this embodiment, as shown in FIG. 1, the rotating force of the worm wheel 15 is directly delivered to a detecting unit 20 constituting a major part of the rotation detecting device, enabling to detect a rotation angle of the steering shaft 12.

As shown in FIGS. 5A and 5B, in the detecting unit 20, a detecting shaft 22 is rotatably supported in a box-formed case 21. The detecting shaft 22, in part, projects to an outside of the case 21, having a tip fixed with an input gear 22a.

Within the case 21, a speed-reducing mechanism is provided to speed-reduce the rotation of the detecting shaft 22. In the showing of FIG. 5, provided as the speed-reducing mechanism are a worm gear 22b and a pinion gear (worm wheel) 23 in mesh with the worm gear 22b. The worm gear 22b is fixed to the detecting shaft 22. Meanwhile, the pinion gear 23 is rotatably supported on a shaft 23a arranged perpendicularly intersecting with the detecting shaft 22. In this manner, by structuring the speed-reducing mechanism with the worm gear 22b and the pinion gear 23, the case 21 can be made small in thickness.

In this embodiment, the pinion gear 23 is formed integrally with the detection rotating member 23b. The detection rotating member 23b is fixed with a magnet M in a ring form. As shown in FIG. 5B, the detection rotating member 23b is formed with teeth of the pinion gear 23 in its outer periphery, and buried with the magnet M at an inside thereof. In this manner, by burying the magnet M at the inside of the pinion gear 23, the detection rotating member 23b can be reduced in thickness.

Within the case 21, a board 24 is fixed in a manner opposed, at surfaces, to the detection rotating member 23b.

The board 24 is fixed with a detecting member 25. The detecting member 25 is opposed to a rotation center of the detection rotating member 23b.

Figure 6:
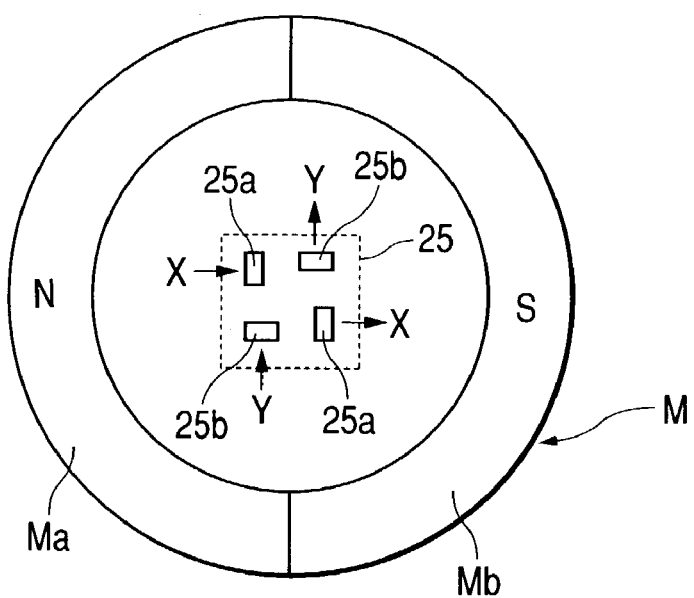
FIG. 6 is a plan view showing an arrangement example of a magnet and detecting member in the detecting unit.

As shown in FIG. 6, the magnet M is a combination of half-ring magnets Ma and Mb each having a range of 180 degrees. One half-ring magnet Ma, in its surface opposed to the board 24, is magnetized with N-pole while the other half-ring magnet Mb, in its surface opposed to the board 24, is magnetized with S-pole.

The detecting member 25 is attached with four magnetism detecting elements arranged in a two-dimensional fashion. The detecting member 25 has, on the board, a first group of two magnetism detecting elements 25a, 25a and a second group of two magnetism detecting elements 25b, 25b, which are connected to configure a bridge circuit.

The two magnetism detecting elements 25a, 25a in the first group are combined such that the detection output assumes a maximum plus value when a magnetic field is rightward (in X direction) and a minimum minus value when a magnetic field is given leftward reverse in direction to that. Also, the two magnetism detecting elements 25b, 25bin the second group are combined such that the detection output assumes a maximum plus value when a magnetic field is upward (in Y direction) and a minimum minus value when a magnetic field is given downward reverse in direction to that.

The magnetism detecting elements 25a, 25b are small-sized magnetic sensors, such as magnetoresistance effect elements or giant magnetoresistance effect elements.

The board 24 is mounted with the control section 26. The control section 26 is connected with a wiring cable 27 extending to the outside of the case 21.

By the structure shown in FIG. 6, obtained from the detecting member 25 are a waveform output S1 approximate to a trigonometric function curve assuming one period whenever the magnet M rotates 360 degrees and a waveform output S2 approximate to a trigonometric function curve having a phase deviated 90 degrees from the waveform output S1. By providing the two waveform outputs S1, S2 to the control section 26, it is possible to know the rotation angle of the magnet M in 360 degrees.

For example, the absolute values of waveform outputs S1, S2 are used to operate $\tan^{-1}$ (|S1|/|S2|) when |S1|>|S2| and to operate $\tan^{-1}$ (|S2|/|S1|) when |S1|<|S2|. Due to this, the rotation angle of the magnet M can be known.

As for attaching the detecting unit 20, in a first embodiment shown in FIGS. 2A and 2B, a ring-formed spur gear 15b is integrally formed in a lower surface of the worm wheel 15. The spur gear 15b is in mesh with an input gear 22a of the detecting unit 20. The power delivery route, from the spur gear 15b to the input gear 22a, constitutes a speed-increasing mechanism.

In a second embodiment shown in FIGS. 3A and 3B, the worm wheel 15 is integrally formed with a gear 15c smaller in diameter than its teeth part 15a, thus configuring a two-staged gear. The gear 15c is in mesh with an input gear 22a of the detecting unit 20, constituting a speed-increasing mechanism.

In a third embodiment shown in FIGS. 4A and 4B, the worm wheel 15 has a lower surface integrally formed with a recess 15d in a ring form. Within the recess 15d, an internal gear 15d1 is integrally formed on the inner side of the teeth part 15a. The internal gear 15d1 is in mesh with the input gear 22a, constituting a speed-increasing mechanism.

In this rotation detecting device, when the steering output part 14 rotates, the worm wheel 15 rotates in unison therewith. The rotation at this time is conveyed, with speed increase, from any of the spur gear 15b, the gear 15c and the internal gear 15d1 to the input gear 22a and detecting shaft 22. Furthermore, within the case 21, the rotation of the detecting shaft 22 is speed-reduced by the worm gear 22b and pinion gear 23, thereby rotating the detection rotating member 23b integral with the pinion gear 23.

In this embodiment, setting is made such that the speed-reduction mechanism has a speed-reduction ratio that is reciprocal to a speed-increasing ratio of the speed-increasing mechanism, providing a correspondence of 1:1 between the rotation angle of the steering output part 14 and the rotation angle of the detection rotating member 23b.

Figure 7:
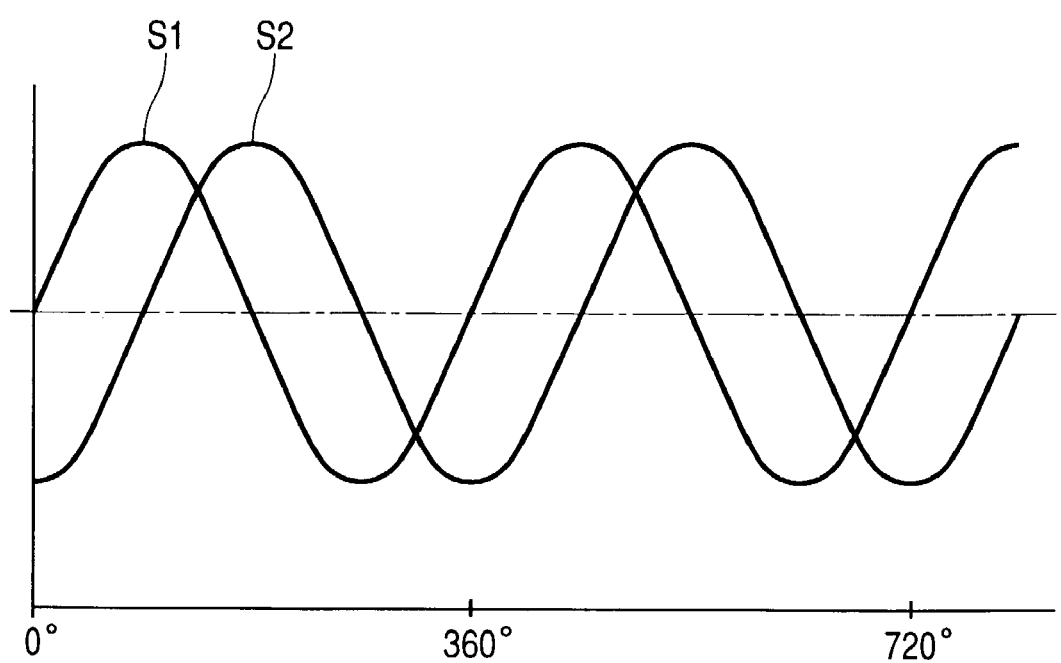
FIG. 7 is a waveform diagram of rotation detection output.

Accordingly, in case a rotation angle of the magnet M is operated from the waveform outputs S1, S2 shown in FIG. 7, it coincides with the rotation angle of the steering shaft 12. Consequently, there is no need to separately provide, as is conventional, detecting means for knowing a rotation speed of the detection rotating member besides a detection output.

Incidentally, by setting the speed-increasing ratio of the speed-increasing mechanism and the speed-reducing ratio of the speed-reducing mechanism, the rotation angle of the detection rotating member 23b may be given one-Nth (N is an integer) of the rotation angle of the steering shaft 12. For example, in the case the foregoing N is "2", it is satisfactory to detect one period of the waveform outputs S1, S2 shown in FIG. 7 as 720 degrees of rotation of the steering shaft 12.

In this manner, by combining the speed-increasing mechanism and the speed-reducing mechanism, even in the case that the pinion gear 23 integral with the detection rotating member 23b has a pitch circle diameter sufficiently smaller than a pitch circle diameter of the worm wheel 15, the detection rotating member 23b can be rotated a rotation angle same as or smaller than a rotation angle of the worm wheel 15. It is possible to simplify the operation control of detection output and configure the detecting unit 20 small in size.

Incidentally, the speed-increasing mechanism may furthermore interpose another gear between any of the spur gear 15b, gear 15c and internal gear 15d1 and the input gear 22a. Also, within the case 21, another gear may be interposed between the worm gear 22b and the pinion gear 23. In any case, the similar detection to the above is possible by setting a speed-increasing ratio and speed-reducing ratio as in the foregoing.

Although a output proportional to a rotation speed of the steering shalt 12 is obtained from the detecting unit 20, by processing the rotation angle thereof by a microcomputer mounted on an automobile, the power assist motor 17 can control the steering shaft 12 during a sharp curve or abrupt steering operation.

Incidentally, the present invention may use another structure than the detection unit 20 shown in FIG. 5 provided that it is of a structure to take out the rotation of the worm wheel 15 and rotate the detection rotating member.

Meanwhile, the detecting unit 20 shown in FIG. 5, because of its small size, may be used in a point requiring to detect a rotation other than the rotation angle detection of the steering shaft 12, e.g. for detecting a rotation angle of a rotatably-supported robot arm.

As described above, in the present invention, the rotation detecting device can be configured small in size. Furthermore, a rotation angle ratio of the rotator as a subject of detection and a rotation angle of the detection rotating member can be set in a relationship of 1:1 or one-Nth (N is an integer).

Also, when detecting a rotation angle of the steering shaft, by utilizing the arrangement region of a power assist rotator, rotation detection is possible without directly providing the rotation detecting member on the steering shaft. It is possible to effectively utilize a space around the steering shaft.

What is claimed is:

1. A rotation detecting device comprising:
   a case;
   an automotive steering shalt is provided with a power assist rotator to which an assist power is to be provided;
   a detecting shaft to be rotated by the power assist rotator, extending inside and outside the case and rotatably supported;
   an input gear provided at an outside of the case and fixed to the detecting shaft;
   a speed-reducing mechanism provided in the case and for speed-reducing a rotation of the detecting shaft;
   a detection rotating member to be rotated by the speed-reducing mechanism so that a speed of the detection rotating member is less than a speed of the rotation of the detecting shaft; and
   a detecting member for detecting a rotation angle of the detection rotating member;
   wherein provided is a speed-increasing mechanism for delivering a rotation with speed increase from the automotive steering shaft as a subject of detection to the input gear, a rotation force from the automotive steering shaft being delivered to the detection rotating member through the speed-increasing mechanism and the speed-reducing mechanism, a rotation angle of the detection rotating member being set at one-Nth of a rotation angle of the automotive steering shaft where N is an integer and $N \geq 2$;
   wherein the speed-reducing mechanism is isolated from the speed-increasing mechanism by the case,
   wherein the speed-increasing mechanism is coupled to the automotive steering shaft and the speed-reducing mechanism is coupled to the detecting shaft, and
   wherein a gear is integrally formed on the power assist rotator, the input gear provided on the detecting shaft being in mesh with the gear formed on the power assist rotator.

2. A rotation detecting device according to claim 1, wherein a plurality of waveform outputs different in phase are to be obtained from the detecting member.

* * * * *